(12) United States Patent
Kanasugi et al.

(10) Patent No.: US 11,570,410 B2
(45) Date of Patent: Jan. 31, 2023

(54) LASER DEVICE, PROJECTION TYPE IMAGE DISPLAY DEVICE AND SENSING DEVICE

(71) Applicant: DEXERIALS CORPORATION, Tokyo (JP)

(72) Inventors: Shunsuke Kanasugi, Tagajo (JP); Kazuyuki Shibuya, Tagajo (JP)

(73) Assignee: DEXERIALS CORPORATION, Tochigi (JP)

( * ) Notice: Subject to any disclaimer, the term of this patent is extended or adjusted under 35 U.S.C. 154(b) by 0 days.

(21) Appl. No.: 17/302,179

(22) Filed: Apr. 26, 2021

(65) Prior Publication Data

US 2021/0337172 A1 Oct. 28, 2021

(30) Foreign Application Priority Data

Apr. 28, 2020 (JP) .............................. JP2020-079142

(51) Int. Cl.
*H04N 9/31* (2006.01)
*G01S 7/481* (2006.01)
(Continued)

(52) U.S. Cl.
CPC .......... *H04N 9/3152* (2013.01); *G01S 7/4811* (2013.01); *G02B 5/0221* (2013.01); *G02B 27/48* (2013.01); *G03B 21/2033* (2013.01); *H04N 9/3161* (2013.01); *H01S 3/005* (2013.01); *H04N 9/31* (2013.01)

(58) Field of Classification Search
CPC ................ G03B 21/145; G03B 21/147; G03B 21/208; G03B 21/2013; G03B 21/2033; G03B 21/2053; G03B 21/2066; H04N 9/31; H04N 9/315; H04N 9/31538; H04N 9/3141; H04N 9/3152; H04N 9/3161; G01S 7/4811; G01S 7/4814; G02B 27/48; G02B 5/0221; G02B 5/0226; G02B 5/0231
See application file for complete search history.

(56) References Cited

U.S. PATENT DOCUMENTS

| | | | |
|---|---|---|---|
| 2003/0039036 A1* | 2/2003 | Kruschwitz | .......... H04N 9/3132 359/623 |
| 2013/0162955 A1* | 6/2013 | Okamoto | ........... G03B 21/2033 353/30 |

(Continued)

FOREIGN PATENT DOCUMENTS

| | | |
|---|---|---|
| JP | 09243964 A | 9/1997 |
| JP | 2000275182 A | 10/2000 |

(Continued)

OTHER PUBLICATIONS

"Japanese Application Serial No. 2020-079142, Office Action dated Apr. 17, 2020", w/English Translation, (Apr. 17, 2020), 11 pgs.
(Continued)

*Primary Examiner* — Sultan Chowdhury
(74) *Attorney, Agent, or Firm* — Schwegman Lundberg & Woessner, P.A.

(57) ABSTRACT

Provided is a laser device, comprising a laser light source, a collimating lens that collimates the light output from the laser light source, and a diffuser plate that diffuses the light from the laser light source before collimating the light.

12 Claims, 10 Drawing Sheets

(51) Int. Cl.
*G02B 27/48* (2006.01)
*G03B 21/20* (2006.01)
*G02B 5/02* (2006.01)
*H01S 3/00* (2006.01)

(56) References Cited

U.S. PATENT DOCUMENTS

| | | | |
|---|---|---|---|
| 2014/0085610 A1* | 3/2014 | Viswanathan | H04N 9/3194 |
| | | | 353/121 |
| 2016/0150225 A1* | 5/2016 | Kurashige | G02B 30/25 |
| | | | 353/8 |
| 2020/0257188 A1* | 8/2020 | Takagi | G03B 21/2066 |
| 2020/0301260 A1* | 9/2020 | Takano | G03B 21/208 |

FOREIGN PATENT DOCUMENTS

| | | |
|---|---|---|
| JP | 3187482 B | 7/2007 |
| JP | 2007233371 A | 9/2007 |
| JP | 2008134269 A | 6/2008 |
| JP | 2014098754 A | 5/2014 |
| JP | 2015114620 A | 6/2015 |
| JP | 2015233053 A | 12/2015 |
| JP | 2016148745 A | 8/2016 |

OTHER PUBLICATIONS

"Japanese Application Serial No. 2020-079142, Office Action dated Jul. 14, 2020", w English Translation, (dated Jul. 14, 2020), 11 pgs.

* cited by examiner

LASER DEVICE, PROJECTION TYPE IMAGE DISPLAY DEVICE AND SENSING DEVICE

CLAIM OF PRIORITY

Priority is claimed on Japanese Patent Application No. 2020-079142, filed Apr. 28, 2020, the contents of which are incorporated herein by reference.

BACKGROUND OF THE INVENTION

Field of the Invention

The present invention relates to a laser device, a projection type image display device, and a sensing device.

Description of Related Art

Laser light is used for various purposes. For example, an image display device and a sensor (for example, a ToF (Time of Flight) sensor and a LiDAR (Light Detection and Ranging) sensor) using a laser as a light source are known.

For example, Patent Documents 1 and 2 describe a laser device using a semiconductor diode as a laser chip.

CITATION LIST

Patent Documents

[Patent Document 1]
Japanese Patent No. 3187482
[Patent Document 2]
Japanese Unexamined Patent Application, First Publication No. 2015-233053

SUMMARY OF THE INVENTION

Speckle noise is generated when a laser is used in an image display device, a sensor, or the like. Speckle noise is noise in which a random fine interference pattern is generated by the diffusion action of an object to be irradiated (for example, a screen) and the interference with coherent laser light.

Speckle noise, for example, causes a significant decrease in the image quality of an image. In order to reduce speckle noise, light is processed by the optical system after it is output from the laser device. For example, an attempt to superimpose light of multiple wavelengths or polarized light using multiple laser devices, an attempt to diffuse the coherent light output from the laser device, and an attempt to mix the angle and polarization of the light emitted from the laser device have been made. However, it is difficult to sufficiently suppress speckle noise even by using these methods. There is also a problem that the entire device becomes large due to the arrangement of the optical system.

The present invention has been made in view of the above problems, and an object of the present invention is to provide a laser device, a projection type image display device, and a sensing device capable of reducing speckle noise.

The present invention provides the following means for solving the above problems.

A laser device according to a first aspect includes a laser light source, a collimating lens that collimates the light output from the laser light source and a diffuser plate that diffuses the light from the laser light source before collimating the light.

In the laser device according to the above aspect, the diffuser plate is a cover member that covers the output surface of the laser light source.

In the laser device according to the above aspect, when the spread angle of the light output from the laser light source in the first direction is $L_x$, and the spread angle in the second direction orthogonal to the first direction is $L_y$, and the spread angle of the light passing through the diffuser plate in the first direction is $\theta_x$ and the spread angle of the second direction is $\theta_y$, the following inequalities, $\theta_x/L_x<1.55$ and $\theta_y/L_y<1.55$, are satisfied.

In the laser device according to the above aspect, when the spread angle of the light output from the laser light source in the first direction is $L_x$, and the spread angle in the second direction orthogonal to the first direction is $L_y$, and the spread angle of the light passing through the diffuser plate in the first direction is $\theta_x$ and the spread angle of the second direction is $Oy$, and the diffusion angle of the diffuser plate is $\theta_d$, and $\theta_d/L_x$ is a, $\theta_x/L_x$ is b, $\theta_d/L_y$ is c, and $\theta_y/L_y$ is d, the following inequalities, $0.0641 \times a^2 + 0.0321 \times a + 0.9 < b < 0.0641 \times a^2 + 0.0321 \times a + 1.09$, and $0.0641 \times c^2 + 0.0321 \times c + 0.9 < d < 0.0641 \times c^2 + 0.0321 \times c + 1.09$, are satisfied.

In the laser device according to the above aspect, when the spread angle of the light output from the laser light source in the first direction is $L_x$, and the spread angle in the second direction orthogonal to the first direction is $L_y$, and the diffusion angle of the diffuser plate is $\theta_d$, the following inequalities, $0<\theta_x/L_x<2.95$ and $0<\theta_y/L_y<2.95$, are satisfied.

A projection type image display device according to a second aspect includes the laser device according to the above aspect and an optical system for projecting light output from the laser device.

A sensing device according to a third aspect includes the laser device according to the above aspect, an optical system that irradiates an object with light from the laser device and a sensor that detects light from the object.

The laser device according to the above aspect can reduce speckle noise.

DETAILED DESCRIPTION OF THE INVENTION

Hereinafter, the present embodiment will be described in detail with reference to the drawings as appropriate. The drawing used in the following description may show characterized portions in a larger size for convenience to facilitate understanding of the features of the present embodiment. For this reason, the dimensional ratios of each component shown in the drawings may differ from the actual ones. Materials, dimensions, etc. exemplified in the following description are examples, and the present invention is not limited thereto, but may be implemented with appropriate modifications without departing from the spirit thereof (Laser Device)

Figure 1:
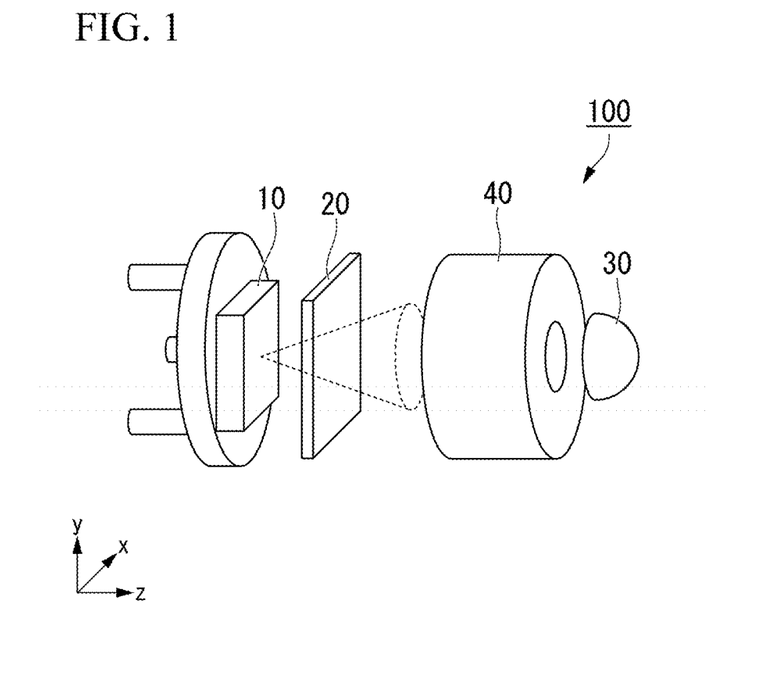
FIG. 1 is a schematic diagram of the laser device which concerns on a first embodiment.

FIG. 1 is a schematic view of the laser device 100 according to the first embodiment. The laser device 100 includes a laser light source 10, a diffuser plate 20, and a collimating lens 30. The laser device 100 may have at least a cap 40 that covers the laser light source 10. Further, the laser device 100 may have a wavelength plate or the like (not shown) between the diffuser plate 20 and the collimating lens 30.

First, the direction is defined. The plane on which the diffuser plate 20 spreads is defined as the xy plane, an arbitrary direction of the xy plane is defined as the x direction, and a direction orthogonal to the x direction is defined as the y direction. The x direction is an example of the first direction. They direction is an example of the second direction. Further, the direction orthogonal to the diffuser plate 20 is defined as the z direction.

The laser light source 10 is not particularly limited. For example, a semiconductor laser, a VCSEL laser, a semiconductor excited solid state (DPSS) laser, and the like may be used. The output band of the laser light source 10 can be selected according to the application, for example, from the visible region to the infrared region. The wavelength of light in the visible region to the infrared region is, for example, 400 nm or more and 2500 nm or less.

The collimating lens 30 is a lens that collimates the diverged laser light. As the collimating lens 30, a known one can be used. The collimating lens 30 collimates the light diffused by the diffuser plate 20 described later, and enhances the directivity of the light output from the laser device 100.

The diffuser plate 20 is located between the laser light source 10 and the collimating lens 30 in the optical path of the light emitted from the laser light source 10. The diffuser plate 20 extends in the x direction and the y direction. Light is incident on the first surface of the diffuser plate 20, and the light incident on the first surface is emitted from the second surface. The diffuser plate 20 diffuses the light from the laser light source 10 before collimating.

Figure 2:
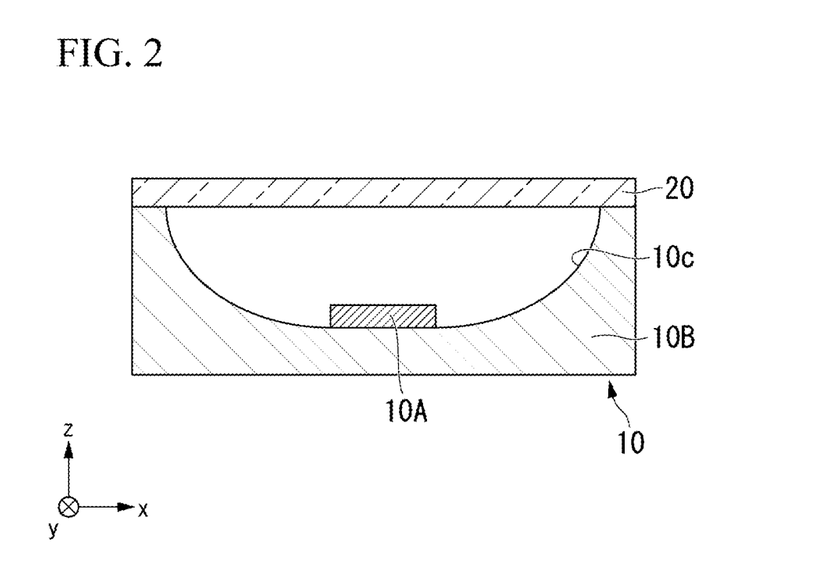
FIG. 2 is an enlarged cross-sectional view of the characteristic part of the laser device which concerns on the first embodiment.

FIG. 2 is an enlarged cross-sectional view of a characteristic portion of the laser device 100 according to the first embodiment. The diffuser plate 20 is integrated with, for example, the laser light source 10. The laser light source 10 has, for example, a light source 10A and a support 10B. The support 10B has a curved surface 10c for emitting light in one direction. The light source 10A is mounted at the center of the curved surface 10c. The diffuser plate 20 is connected to the support 10B. The support 10B and the diffuser plate 20 may be combined and regarded as a cover member (cap 40) that protects the light source 10A. The space between the curved surface 10c of the support 10B and the diffuser plate 20 may be sealed with a resin. The diffuser plate 20 does not necessarily have to be integrated with the laser light source 10, and the diffuser plate may be separated from the laser light source 10.

The diffuser plate 20 is, for example, a frost type diffuser plate or a microlens type diffuser plate. Hereinafter, the case of a microlens type diffuser plate will be described as an example of the diffuser plate.

Figure 3:
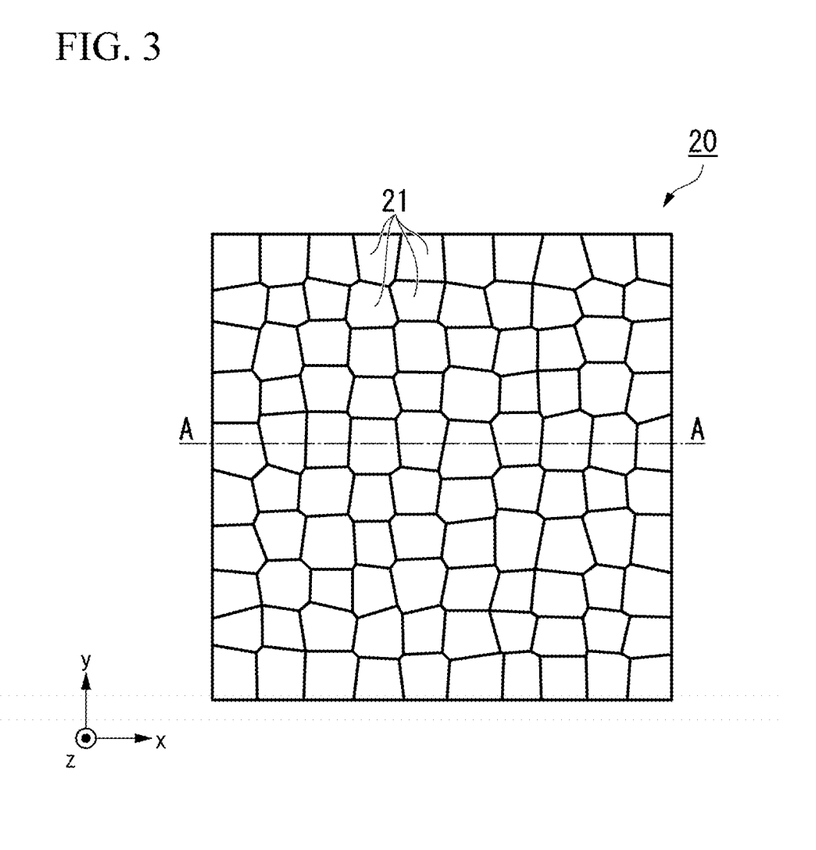
FIG. 3 is a top view of the diffuser plate which concerns on the first embodiment.
Figure 4:
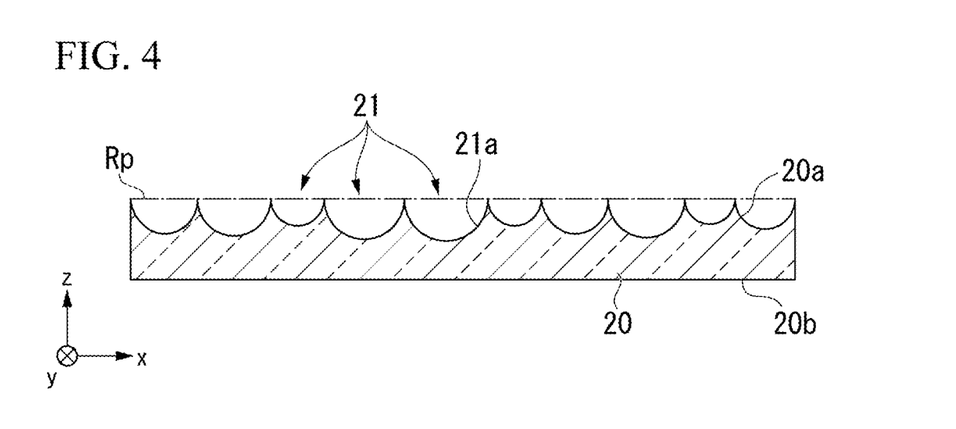
FIG. 4 is a cross-sectional schematic view of the diffuser plate which concerns on the first embodiment.

FIG. 3 is a plan view of the diffuser plate 20 according to the first embodiment. FIG. 4 is a cross-sectional view of the diffuser plate 20 according to the first embodiment. FIG. 4 is a cross section of the diffuser plate 20 cut along the line A-A in FIG. 3.

In the diffuser plate 20, for example, a plurality of microlenses 21 are arranged in a matrix in a plan view from the z direction. Each of the microlenses 21 is, for example, substantially rectangular. The microlens 21 is not limited to a substantially rectangular shape, and may be a circular shape, an elliptical shape, a substantially hexagonal shape, or a substantially triangular shape. The arrangement of the microlenses 21 may be a hexagonal close-packed arrangement or a random arrangement. The size of the microlens 21 is, for example, about 100 μm.

The microlens 21 is densely present in the diffuser plate 20. That is, there is no non-lens region between the microlenses 21. Therefore, there is a ridgeline between the microlenses 21. If the height and direction of the ridgeline are irregular, diffraction by the diffuser plate 20 is suppressed. Adjacent ridges are preferably not parallel to each other.

The microlens 21 is, for example, a concave lens that is recessed with respect to the reference surface Rp of the diffuser plate 20. The microlens 21 may be, for example, a convex lens that protrudes with respect to the reference plane Rp. The reference plane Rp is a plane parallel to the xy plane and is a plane in contact with the most protruding portion of the first plane 20a. The reference surface Rp is, for example, the surface of the substrate before processing the concave portion to be the microlens 21 of the diffuser plate 20. Although FIG. 4 shows an example in which the microlens 21 is located only on the first surface 20a of the diffuser plate 20, the microlens 21 may be located on both the first surface 20a and the second surface 20b. The radius of curvature of each of the microlenses 21 may be random.

The diffuser plate 20 is made of, for example, a material capable of transmitting light in an incident wavelength band. The diffuser plate 20 is, for example, optical glass, crystal, sapphire, resin plate, or resin film. The optical glass is, for example, quartz glass, borosilicate glass, white plate glass, or the like. The resin is, for example, polymethylmethacrylate (PMMA), polyethylene terephthalate (PET), polycarbonate (PC), cyclic olefin copolymer (COC) and the like. Inorganic materials such as optical glass, quartz and sapphire have excellent light resistance. Quartz and sapphire have excellent heat dissipation.

The diffusion of light by the diffuser plate 20 is, for example, within a predetermined range. The degree of light diffusion by the diffuser plate 20 is defined by the diffusion angle $\theta_d$ of the diffuser plate, the spread angles $L_x$ and $L_y$ of the light incident on the diffuser plate 20 from the laser light source 10, and the spread angles $\theta_x$ and $\theta_y$ of the light emitted from the diffuser plate 20.

Figure 5:
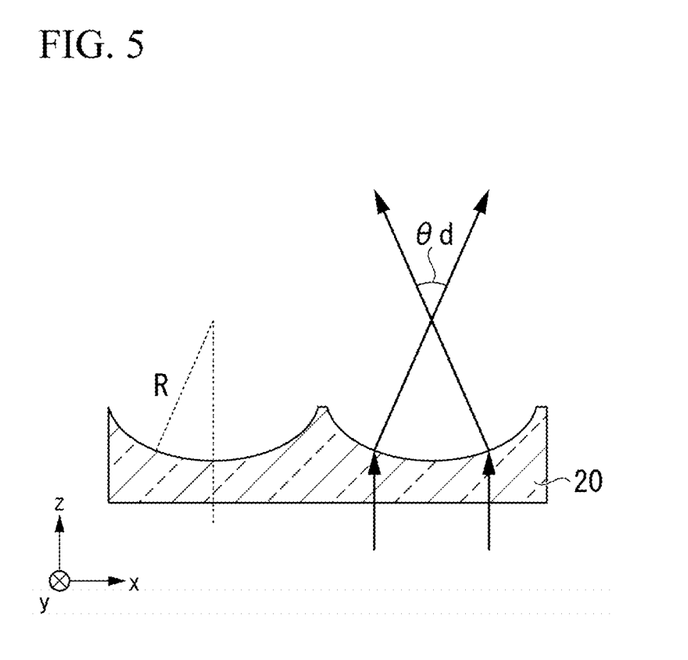
FIG. 5 is a schematic diagram for explaining the definition of the diffusion angle of the diffuser plate which concerns on the first embodiment.

FIG. 5 is a schematic diagram for explaining the definition of the diffusion angle of the diffuser plate according to the first embodiment. The diffusion angle $\theta_d$ of the diffuser plate 20 satisfies the following relationship with respect to the radius of curvature R of the microlens, the refractive index n of the diffuser plate 20, and the average distance p of the adjacent microlenses 21.

$$\theta_d = 2\sin^{-1}\{(p(n-1)/2R)\}$$

The diffusion angle $\theta_d$ of the diffuser plate 20 can also be defined as the spread angle of the light emitted from the diffuser plate 20 when parallel light is incident.

Figure 6:
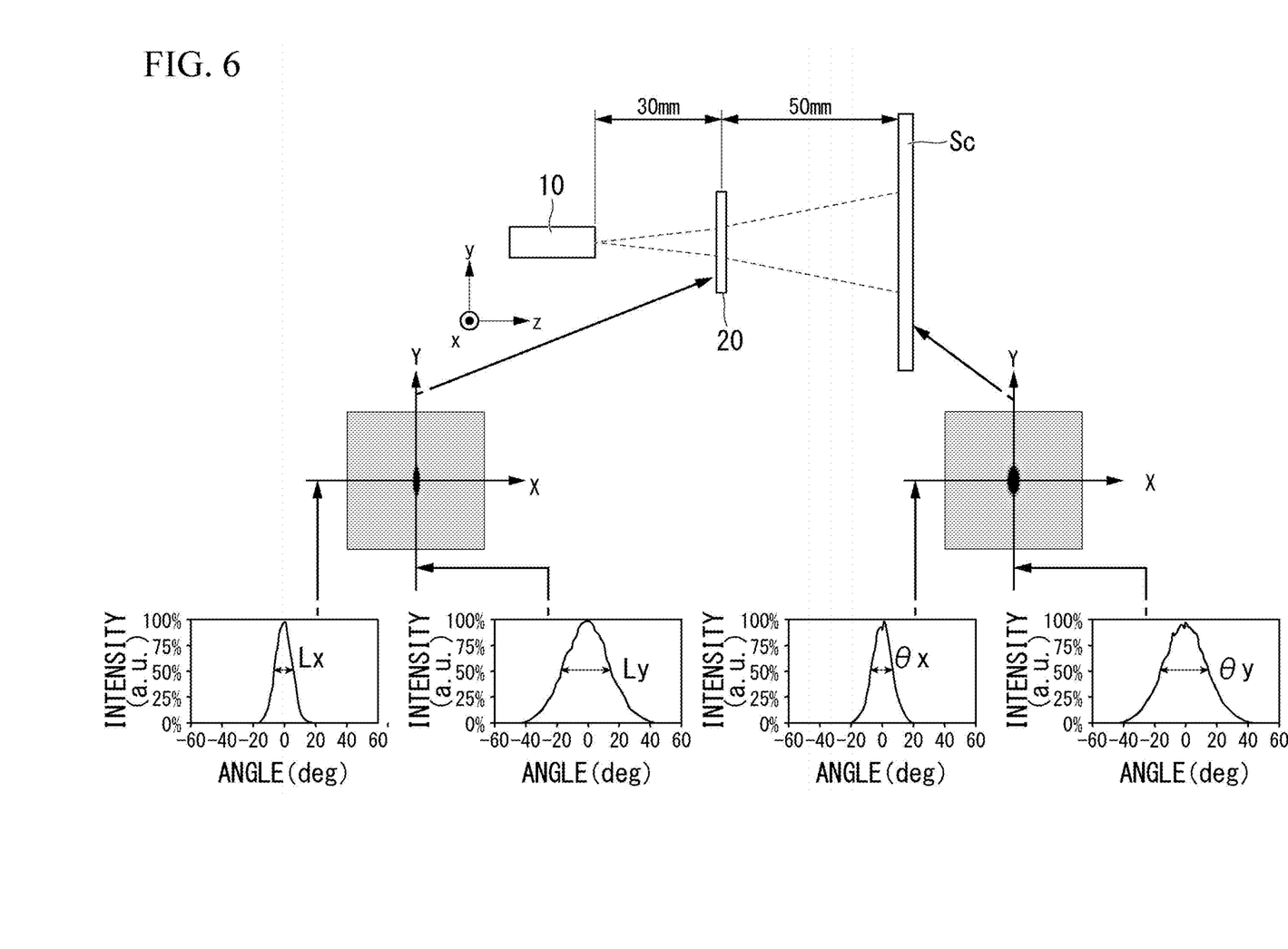
FIG. 6 is a a schematic diagram for explaining the definition of the spread angle of the light from the laser light source and the diffusing plate which concerns on the first embodiment.

FIG. 6 is a schematic diagram for explaining the definition of the spread angle of the light from the laser light source 10 and the diffuser plate 20 according to the first embodiment. As shown in FIG. 6, the light emitted from the laser light source 10 is incident on the diffuser plate 20 while spreading.

The spread angles $L_x$ and $L_y$ of the light incident on the diffuser plate 20 from the laser light source 10 are the degree of spread of the light from the laser light source 10 toward the diffuser plate 20. The spread angle $L_x$ is the full width at half maximum of the directivity angle in the x direction (FWHM), and the spread angle $L_y$ is the full width at half maximum of the directivity angle in the y direction (FWHM). The full width at half maximum of the directivity angle is an angle at which the relative radiant intensity is 50% or more of the peak value.

The spread angles $\theta_x$ and $\theta_y$ of the light emitted from the diffuser plate 20 are the degree of spread of the light from the diffuser plate 20 toward the screen Sc. The spread angle $\theta_x$ is the full width at half maximum of the directivity angle in the x direction (FWHM), and the spread angle $\theta_y$ is the full width at half maximum of the directivity angle in the y direction (FWHM). When the light incident on the diffuser plate 20 is parallel light, the spread angles $\theta_x$ and $\theta_y$ coincide with the diffusion angles $\theta_d$ in the x direction and the y direction, respectively.

The diffuser plate 20 satisfies, for example, $\theta_x/L_x < 1.55$ and $\theta_y/L_y < 1.55$. Further, the ranges of $\theta_x/L_x$ and $\theta_y/L_y$ preferably satisfy $\theta_x/L_x < 1.50$ and $\theta_y/L_y < 1.50$, the ranges of $\theta_x/L_x$ and $\theta_y/L_y$ more preferably satisfy $\theta_x/L_x < 1.40$ and $\theta_y/L_y < 1.40$, and the ranges of $\theta_x/L_x$ and $\theta_y/L_y$ more preferably satisfy $\theta_x/L_x < 1.30$ and $\theta_y/L_y < 1.30$. The diffuser plate 20 may satisfy, for example, $0.9 < \theta_x/L_x$ and $0.9 < \theta_y/L_y$, and may satisfy $1.0 < \theta_x/L_x$ and $1.0 < \theta_y/L_y$. When the diffusing plate 20 satisfies this condition, it is possible to prevent the light after passing through the diffusing plate 20 from spreading too much. If the light after passing through the diffuser plate 20 spreads too much, the angle range of the incident angle of the light incident on the collimating lens 30 becomes wide, and the accuracy of collimating the light by the collimating lens 30 decreases.

Further, the diffuser plate 20 satisfies both the following relational expressions (1) and (2) when $\theta_d/L_x$ is a, $\theta_x/L_x$ is b, $\theta_d/L_y$ is c, and $\theta_y/L_y$ is d.

$$0.0641 \times a^2 + 0.0321 \times a + 0.9 < b < 0.0641 \times a^2 + 0.0321 \times a + 1.09 \quad (1)$$

$$0.0641 \times c^2 + 0.0321 \times c + 0.9 < d < 0.0641 \times c^2 + 0.0321 \times c + 1.09 \quad (2)$$

When the diffuser plate 20 satisfies the above relational expression, if the spread angle of the light source 10 and the diffusion angle of the diffuser plate 20 are determined, the spread of the light incident on the collimating lens can be easily estimated, and the design of the optical system become easy.

Further, the diffuser plate 20 satisfies, for example, $0 < \theta_d/L_x < 2.95$ and $0 < \theta_d/L_y < 2.95$. Further, $\theta_d/L_x$ and $\theta_d/L_y$ preferably satisfy $0 < \theta_d/L_x < 2.83$ and $0 < \theta_d/L_y < 2.83$, and more preferably $0 < \theta_d/L_x < 2.56$ and $0 < \theta_d/Ly < 2.56$, and more preferably $0 < \theta_d/L_x < 2.27$ and $0 < \theta_d/L_y < 2.27$. When the diffuser plate 20 satisfies this condition, speckle noise can be further reduced. Further, when the diffuser plate 20 satisfies this condition, speckle noise can be reduced by simply arranging the diffuser plate 20 between the laser light source of a commercially available laser device and the collimating lens, which is excellent in versatility.

The diffuser plate 20 may have an antireflection film that covers at least one of the first surface 20a and the second surface 20b. The antireflection film is, for example, a laminated film in which a low refractive index layer and a high refractive index layer are laminated. The low refractive index layer is, for example, $SiO_2$, $MgF_2$, $CaF_2$. The high refractive index layer is, for example, $Nb_2O_5$, $TiO_2$, $Ta_2O_5$, $Al_2O_3$, $HfO_2$, $ZrO_2$, $SiO_2$, $Nb_2O_5$ and $Ta_2O_5$ have excellent light resistance and are not easily deteriorated even when irradiated with light having a high light density emitted by a high-power laser or the like. Further, the antireflection film may have a moth-eye structure in which fine irregularities having a pitch of several hundred nm are arranged.

The diffuser plate 20 can be manufactured by sequentially performing a resist coating step, an exposure/development step, and an etching step.

In the resist coating step, the resist is coated on the substrate. The substrate becomes a diffuser plate 20 after processing, and is made of the same material as the diffuser plate 20. In the etching step described later, a fluorine-based etching gas ($CF_4$, $SF_6$, $CHF_3$, etc.) may be used as the etching gas. $Al_2O_3$, alkali metal, etc. contained in the substrate may react with the fluorine-based etching gas to become a non-volatile substance. For example, when a glass substrate containing 27% of $Al_2O_3$ (for example, Eagle XG manufactured by Corning Inc.) that does not contain alkali metal is etched with a fluorine-based etching gas, $Al_2O_3$ that is difficult to be etched remains, and microprojections are generated on the surface, and the transmittance of the glass substrate decreases. The substrate preferably has an alkaline component content of 20% by mass or less, and more preferably 10% by mass or less. The substrate is preferably, for example, quartz glass or borosilicate glass. As the resist, known ones can be applied.

Next, in the exposure step, the resist is exposed to light by irradiating the resist through a gray scale mask. The exposure is, for example, step-and-repeat exposure in which repeated exposure is performed while moving the gray scale mask. Depending on the position accuracy of stepping, a joint having a width of up to several μm may be formed between the basic cells formed by one exposure. In order to avoid such a problem, it is preferable to expose the basic cells so that they overlap each other. When the basic cells are largely overlapped with each other, it may be adjusted so that the desired exposure amount is obtained by a plurality of exposures.

Next, in the developing step, the exposed resist pattern is developed. Part of the resist is removed by development to obtain a resist having a resist pattern on its surface. A resist pattern similar to that of a desired microlens array is formed on the surface of the resist.

Next, in the etching step, the substrate is dry-etched through the resist. Dry etching is performed using, for example, a reactive gas. The gas is, for example, the above-mentioned fluorine-based etching gas. The pattern of the microlens array formed on the surface of the resist by dry etching is transferred to the substrate. The substrate is a diffuser plate 20 in which a plurality of microlenses 21 are formed on the first surface 20a. When forming the microlens 21 on both sides of the diffuser plate 20, the same procedure is performed on the second surface 20b opposite to the first surface 20a.

The laser device according to the first embodiment can reduce speckle noise by first diffusing the light before collimating. Speckle noise is a noise generated by a diffuse action on an object to be irradiated (for example, a screen) and interference with a coherent laser beam, and this is a problem that occurs characteristically when the emitted light is coherent light.

The diffuser plate 20 according to the first embodiment is arranged between the laser light source 10 and the collimating lens 30. Therefore, as for the light emitted from the laser light source 10, the light once diffused by the diffuser plate 20 is incident on the collimating lens 30. By passing through the diffuser plate 20, the coherence of the light emitted from the laser light source 10 is lowered, and the speckle noise is lowered.

Further, by setting the degree of diffusion of the diffuser plate 20 within a predetermined range, it is possible to reduce speckle noise and maintain light directivity. The laser light is one of the features of its directivity and straightness, and the light output from the laser device 100 is required to have these features. On the other hand, light with high directivity and straightness has high coherence and tends to generate speckle noise. By setting the degree of diffusion of the diffuser plate within a predetermined range, speckle noise can be reduced while maintaining the characteristics of the directivity and straightness of the laser beam.

Although the first embodiment has been described in detail above, it is not limited to the example, and various modifications and changes can be made within the scope of the present invention described in the claims.

Figure 7:
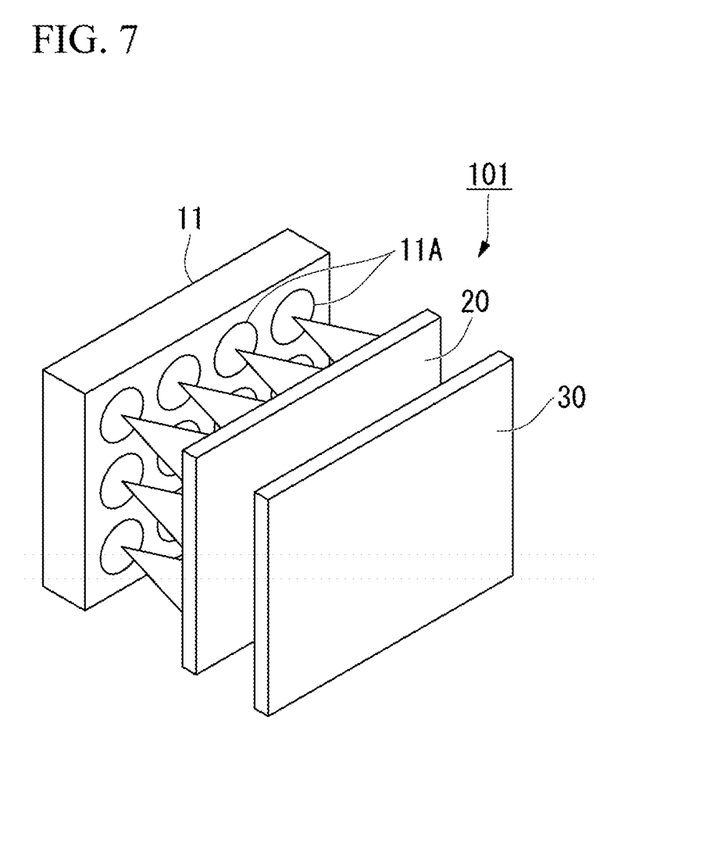
FIG. 7 is a schematic diagram of the laser device which concerns on the first modification.

FIG. 7 is a schematic view of the laser device 101 according to the first modification. The laser device 101 includes a laser light source 11, a diffuser plate 20, and a collimating lens 30. The structure of the laser light source 11 of the laser device 101 is different from that of the laser device 100. In the first modification, the same configuration as that of the laser device 100 is designated by the same reference numerals and the description thereof will be omitted.

The laser light source 11 has a plurality of diodes 11A. The diodes 11A are arranged, for example, in the x-direction and the y-direction. Each of the diodes 11A emits light. The laser light source 11 emits light from a diode group in which a plurality of diodes 11A are gathered. The diffuser plate 20 may be a cover member that covers the diode group.

Even when there are a plurality of light sources as in the laser device 101 according to the first modification, speckle noise can be reduced in the same manner. Further, if the wavelength of the light emitted from each diode 11A is varied, speckle noise can be further reduced.

Further, the above-mentioned laser devices 100 and 101 can be applied to a projection type image display device and a sensing device.

Figure 8:
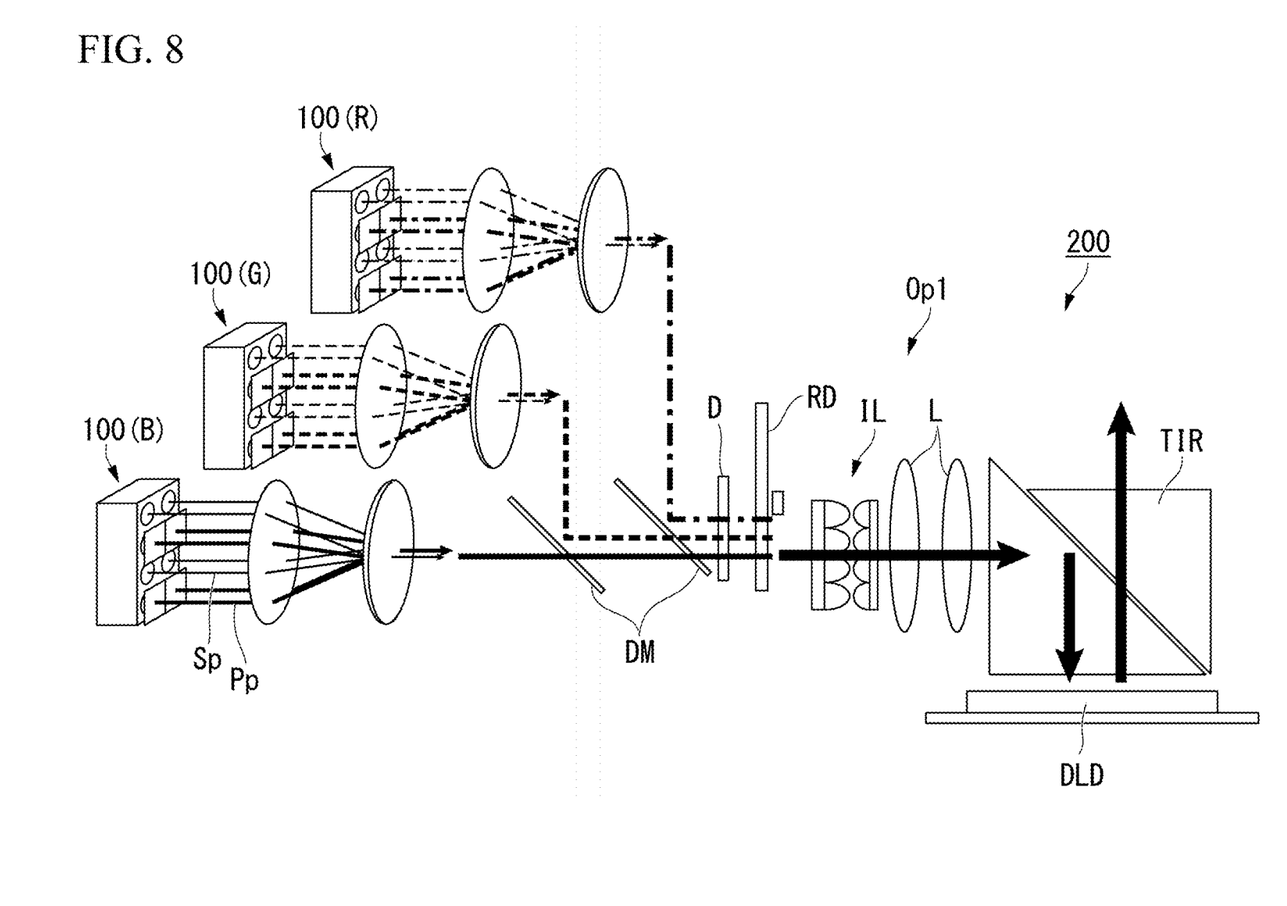
FIG. 8 is a schematic diagram of the projection type image display device which concerns on the first application example.

FIG. 8 is a schematic view of the projection type image display device 200 according to the first application example. The projection type image display device 200 is, for example, a laser television or a DLP projector. The projection type image display device 200 has a plurality of laser devices 100 and an optical system Op1.

Each of the plurality of laser devices 100 outputs, for example, one of red R, green G, and blue B. Each of the laser devices 100 is a laser device according to the first embodiment. The s-polarized light Sp and the p-polarized light Pp of the light output from the laser device 100 may be superimposed.

The optical system Op1 includes, for example, a dichroic mirror DM, a diffuser D, a rotary diffuser DR, an integrated lens IL, a plurality of lenses L, a digital microdevice DLD, and a prism TIR. The light output from the laser device 100 is overlapped by the dichroic mirror DM and the diffuser D, and is condensed by the integrated lens IL and the plurality of lenses L. The condensed light reaches the digital microdevice DLD via the prism TIR. The digital microdevice DLD controls ON/OFF of light and outputs light to the outside via a prism TIR.

In the projection type image display device 200 according to the first application example, the coherence of the light output from the laser device 100 is suppressed, and speckle noise is unlikely to occur.

Figure 9:
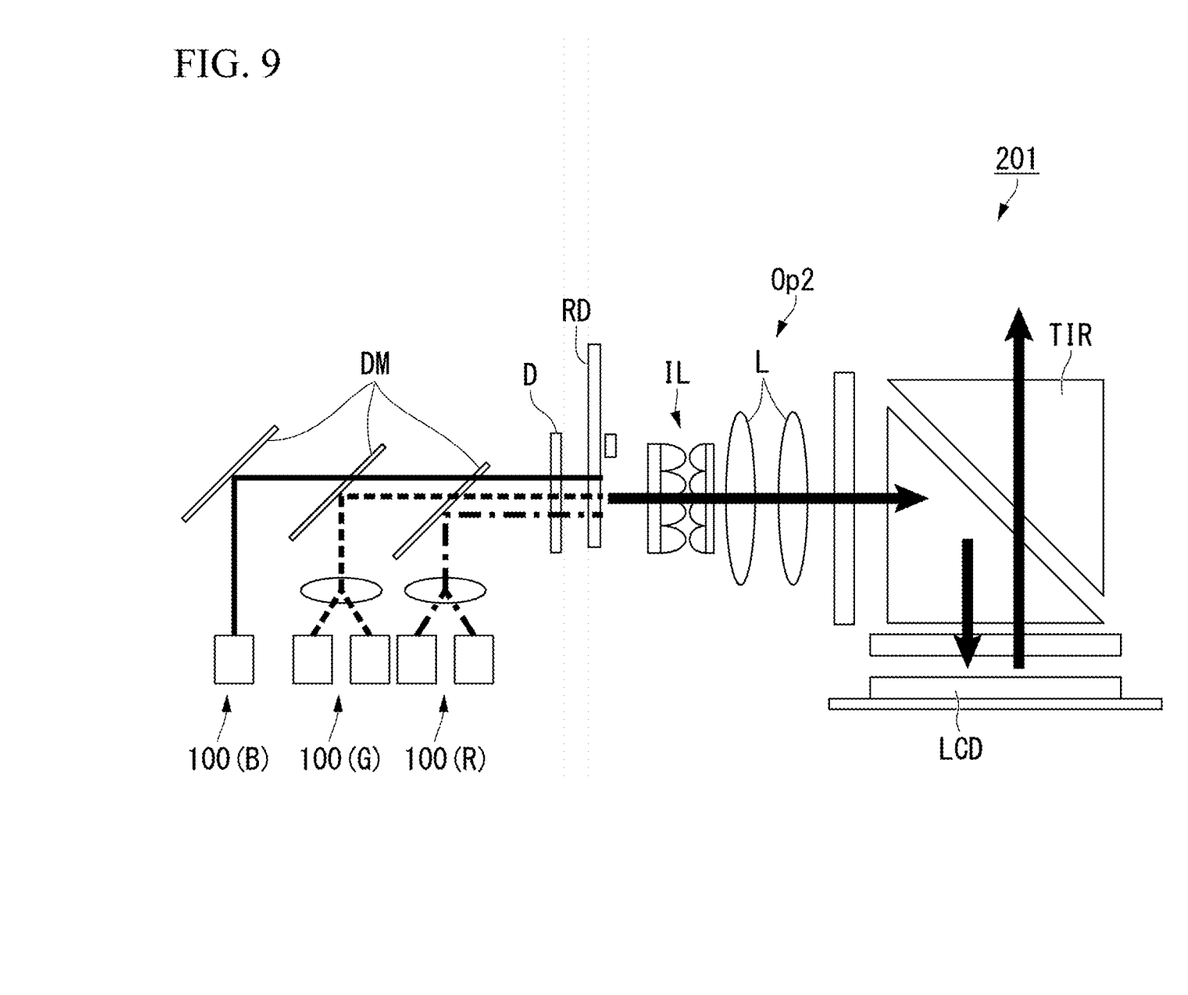
FIG. 9 is a schematic diagram of the projection type image display device which concerns on the second application example.

FIG. 9 is a schematic view of the projection type image display device 201 according to the second application example. The projection type image display device 201 is, for example, an LCOS projector. The projection type image display device 201 has a plurality of laser devices 100 and an optical system Op2. The second application example is different in that the digital microdevice DLD replaces the reflective liquid crystal LCD. The description of the configuration similar to that of the first application example will be omitted.

In the projection type image display device 201 according to the second application example, the coherence of the light output from the laser device 100 is suppressed, and speckle noise is unlikely to occur.

Figure 10:
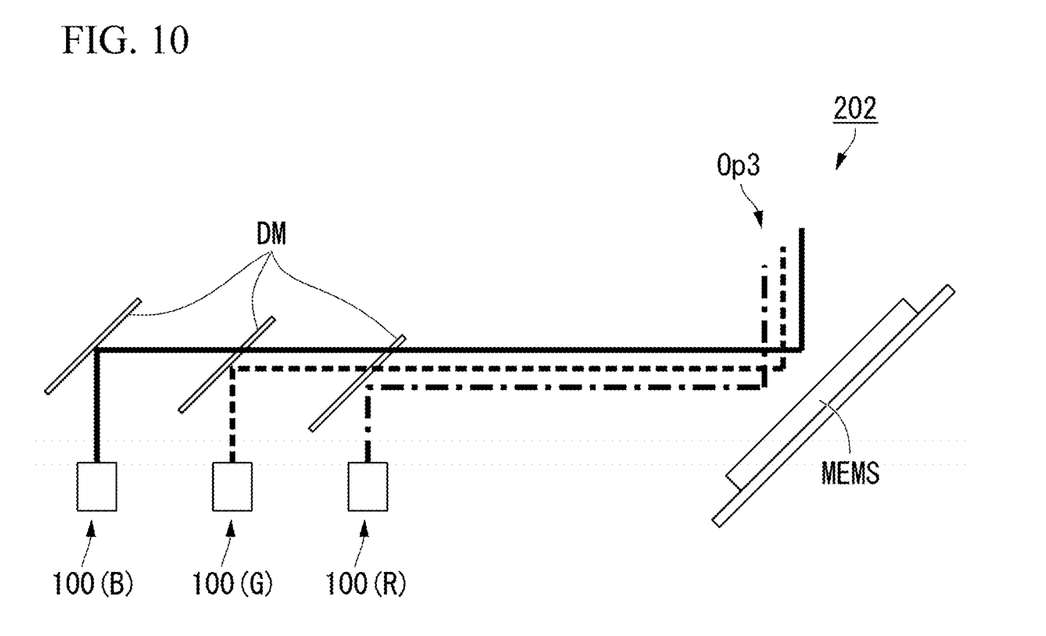
FIG. 10 is a schematic diagram of the projection type image display device which concerns on the third application example.

FIG. 10 is a schematic view of the projection type image display device 202 according to the third application example. The projection type image display device 202 is, for example, a head-up display. The projection type image display device 202 has a plurality of laser devices 100 and an optical system Op3. The optical system Op3 has a dichroic mirror DM and a mems mirror MEMS. The mems mirror MEMS is a microelectromechanical system that controls light from each of a plurality of laser devices 100.

In the projection type image display device 202 according to the third application example, the coherence of the light output from the laser device 100 is suppressed, and speckle noise is unlikely to occur.

Figure 11:
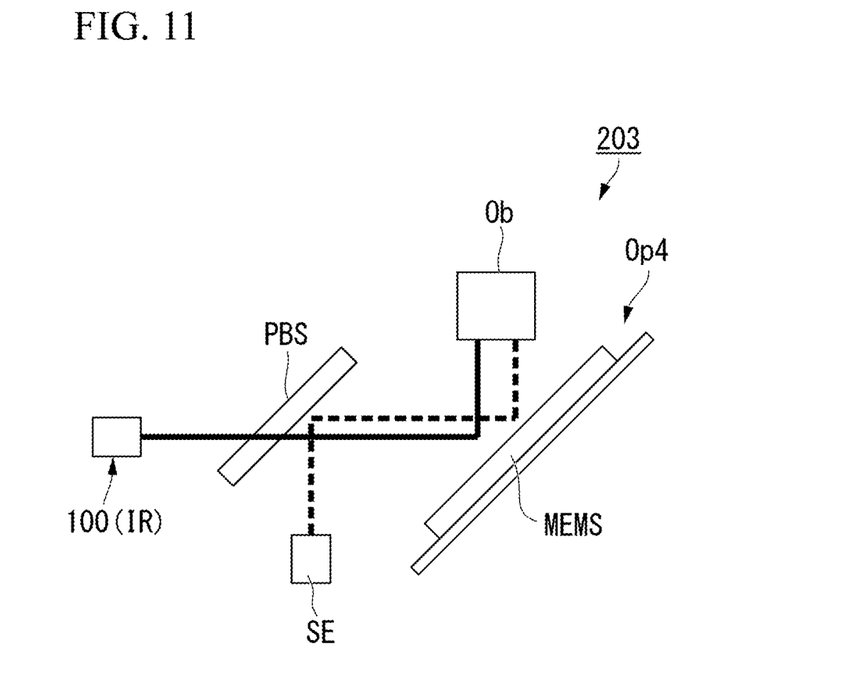
FIG. 11 is a schematic diagram of the projection type image display device which concerns on the fourth application example.

FIG. 11 is a schematic view of the sensing device 203 according to the fourth application example. The sensing device 203 is, for example, an in-vehicle Time of Flight (TOF) type sensor. The sensing device 203 measures, for example, the distance to the object Ob.

The sensor 203 includes a laser device 100, an optical system Op4, and a sensor SE. The laser device 100 emits infrared light, for example. The optical system Op4 has, for example, a polarizing beam splitter PBS and a mems mirror MEMS.

The light emitted from the laser device 100 passes through the polarizing beam splitter PBS, is reflected by the mems mirror MEMS, and irradiates the object Ob. The light reflected by the object Ob is reflected again by the mems mirror MEMS and incident on the sensor SE via the polarizing beam splitter PBS. The sensor SE detects the three-dimensional information of the object Ob from the information of the incident light.

In the sensing device 203 according to the fourth application example, the coherence of the light output from the laser device 100 is suppressed, and speckle noise is unlikely to occur. Infrared light having a long wavelength tends to generate speckle noise, but speckle noise can be reduced by using the laser device 100.

Figure 12:
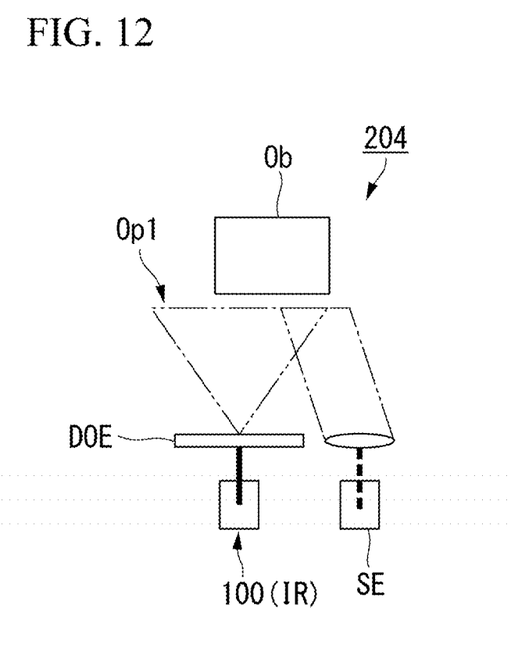
FIG. 12 is a schematic diagram of the projection type image display device which concerns on the fifth application example.

FIG. 12 is a schematic view of the sensing device 204 according to the fifth application example. The sensing device 204 is, for example, an image sensor. The sensing device 204 is used, for example, for a face recognition function of a mobile phone.

The sensing device 204 includes a laser device 100, an optical system Op5, and a sensor SE. The laser device 100 emits infrared light, for example. The optical system Op5 has, for example, a diffractive optical element DOE. The light emitted from the laser device 100 is diffracted by the diffractive optical element DOE, and the object is irradiated with Ob. The light reflected by the object Ob is incident on the sensor SE. The sensor SE detects the three-dimensional information of the object Ob from the information of the incident light.

In the sensing device 204 according to the fifth application example, the coherence of the light output from the laser device 100 is suppressed, and speckle noise is unlikely to occur. Infrared light having a long wavelength tends to generate speckle noise, but speckle noise can be reduced by using the laser device 100.

The application examples presented here are examples of applications of laser devices, and are not limited to these examples. Alternatively, the laser device 101 may be used instead of the laser device 100.

EXAMPLE

Example 1

Figure 13:
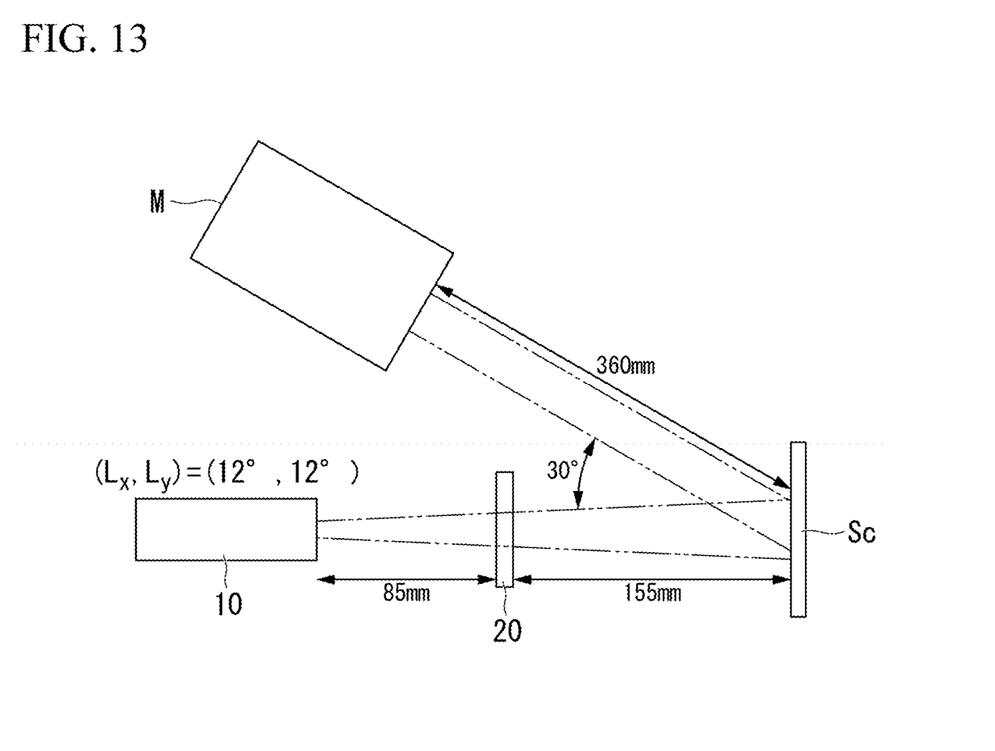
FIG. 13 is a schematic diagram of the optical system used for the evaluation of Examples 1 to 8 and Comparative Example 1.

FIG. 13 is a schematic diagram of the optical system used for the evaluation of Examples 1 to 8 and Comparative Example 1. The optical system of the first embodiment includes a laser light source 10, a diffuser plate 20, a screen Sc, and a measuring device M.

As the laser light source 10, a coherent light source having a wavelength of 532 nm was used. The spread angles $L_x$ and $L_y$ of the light emitted from the laser light source 10 were both set to 12°.

The diffuser plate 20 was arranged at a position 85 mm away from the emission surface of the laser light source 10 so that the optical axis of the light beam from the laser light source 10 and the diffuser plate 20 were orthogonal to each other. The diffusion angle of the diffuser plate was set to 1.0°.

The screen Sc was installed at a position 155 mm away from the diffuser plate 20. The screen Sc and the diffuser plate 20 were arranged substantially in parallel. A standard reflection scattering plate (Spectralon) was used as the screen Sc.

The measuring machine M was placed 360 mm away from the screen Sc at a position where the reflected light from the screen Sc could be read in a direction inclined by 30° from the optical axis. As the measuring machine M, a speckle contrast measuring machine (manufactured by OXIDE Co., Ltd.) was used.

Then, the speckle contrast Cs measured by the measuring machine M was obtained. The speckle contrast Cs accurately reflects the speckle noise generated in the human retina and is obtained from the standard deviation of the bright part and the dark part. The larger the speckle contrast Cs, the larger the speckle noise.

In Example 1, the speckle contrast Cs was measured by the above method and found to be 0.32.

Examples 2-8

Examples 2 to 8 are different from Example 1 in that the diffusion angle of the diffuser plate 20 is changed. Speckle contrast Cs was measured under the same other conditions.

Comparative Example 1

Comparative Example 1 is different from Example 1 in that the diffuser plate 20 is not used. Speckle contrast Cs was measured under the same other conditions.

Figure 14:
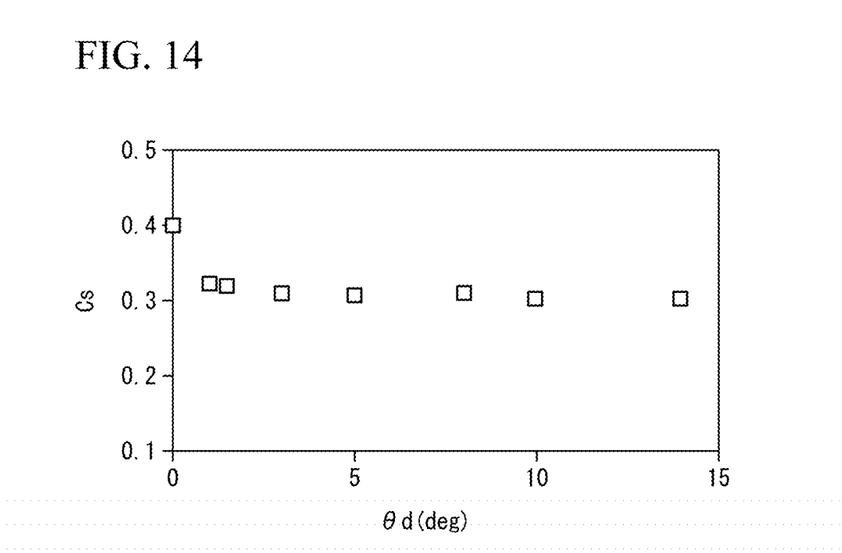
FIG. 14 is a graph summarizing the results of Examples 1 to 8 and Comparative Example 1.

The results of Examples 1 to 8 and Comparative Example 1 are summarized in Table 1 and FIG. 14.

TABLE 1

|  | $\theta_d$ (deg) | Cs |
| --- | --- | --- |
| Comparative Example 1 | 0.0 | 0.40 |
| Example 1 | 1.0 | 0.32 |
| Example 2 | 1.5 | 0.32 |
| Example 3 | 3.0 | 0.31 |
| Example 4 | 5.0 | 0.31 |
| Example 5 | 8.0 | 0.31 |
| Example 6 | 10.0 | 0.30 |
| Example 7 | 14.0 | 0.30 |
| Example 8 | 16.0 | 0.30 |

Comparing the results of Examples 1 to 8 and Comparative Example 1, it can be seen that the speckle noise is reduced by diffusing the light emitted from the laser light source 10 by the diffuser plate 20.

Example 9

In Example 9, the optical system shown in FIG. 6 is assembled, and the relationship between the spread angles $L_x$ and $L_y$ of the laser light source 10, the diffusion angle $\theta_d$ of the diffuser plate 20, and the spread angles $\theta_x$ and $\theta_y$ of the light emitted from the diffuser plate 20 by simulation was determined. The simulation was performed using Zemax OpticStudio.

As the laser light source 10, a coherent light source having a wavelength of 635 nm was used. The spread angle $L_x$ in the x direction of the light emitted from the laser light source 10 was 3.55°, and the spread angle in the y direction was 32.61°.

The diffuser plate 20 is arranged at a position 30 mm away from the emission surface of the laser light source 10 so that the optical axis of the light beam from the laser light source 10 and the diffuser plate 20 are orthogonal to each other. The refractive index of the diffuser was 1.47. The diffusion angle of the diffuser plate was 0.97.

The screen Sc was installed at a position 50 mm away from the diffuser plate 20. The screen Sc and the diffuser plate 20 were arranged substantially in parallel. The spread angles $\theta_x$ and $\theta_y$ of the light emitted from the diffuser plate 20 were obtained from an angle at which the relative radiant intensity of the light applied to the screen Sc was 50% or more of the peak value.

Examples 10-17

In Examples 10 to 17, the diffusion angles $L_x$ and $L_y$ of the laser light source 10 were fixed, and the diffusion angle $\theta_d$ of the diffuser plate 20 was changed. Other conditions were the same as in Example 9, and the spread angles $\theta_x$ and $\theta_y$ of the light emitted from the diffuser plate 20 were obtained.

Comparative Example 2

Comparative Example 2 is different from Example 1 in that the diffuser plate 20 is not arranged. That is, the diffusion angle $\theta_d$ was set to 0°. Other conditions were the same as in Example 9, and the spread angles $\theta_x$ and $\theta_y$ of the light emitted from the diffuser plate 20 were obtained.

The results of Examples 9 to 17 and Comparative Example 2 are summarized in Tables 2 and 3.

TABLE 2

|  | $L_x$ (deg) | $\theta_d$ (deg) | $\theta_x$ (deg) | $\theta_d/L_x$ | $\theta_x/L_x$ |
|---|---|---|---|---|---|
| Comparative Example 2 | 3.55 | 0 | 3.55 | 0 | 1.000 |
| Example 9 | 3.55 | 0.97 | 3.58 | 0.273 | 1.008 |
| Example 10 | 3.55 | 1.97 | 3.39 | 0.555 | 0.955 |
| Example 11 | 3.55 | 2.93 | 3.71 | 0.825 | 1.045 |
| Example 12 | 3.55 | 3.91 | 3.92 | 1.101 | 1.104 |
| Example 13 | 3.55 | 4.88 | 4.18 | 1.375 | 1.177 |
| Example 14 | 3.55 | 5.85 | 4.34 | 1.648 | 1.223 |
| Example 15 | 3.55 | 7.78 | 4.77 | 2.192 | 1.344 |
| Example 16 | 3.55 | 9.74 | 5.83 | 2.744 | 1.642 |
| Example 17 | 3.55 | 12.17 | 6.33 | 3.428 | 1.783 |

TABLE 3

|  | $L_y$ (deg) | $\theta_d$ (deg) | $\theta_y$ (deg) | $\theta_d/L_y$ | $\theta_y/L_y$ |
|---|---|---|---|---|---|
| Comparative Example 2 | 32.61 | 0 | 32.61 | 0 | 1.000 |
| Example 9 | 32.61 | 0.97 | 32.02 | 0.030 | 0.982 |
| Example 10 | 32.61 | 1.97 | 30.38 | 0.060 | 0.932 |
| Example 11 | 32.61 | 2.93 | 32.75 | 0.090 | 1.004 |
| Example 12 | 32.61 | 3.91 | 32.36 | 0.120 | 0.992 |
| Example 13 | 32.61 | 4.88 | 32.44 | 0.150 | 0.995 |
| Example 14 | 32.61 | 5.85 | 32.09 | 0.179 | 0.984 |
| Example 15 | 32.61 | 7.78 | 31.52 | 0.239 | 0.967 |
| Example 16 | 32.61 | 9.74 | 31.29 | 0.299 | 0.960 |
| Example 17 | 32.61 | 12.17 | 31.34 | 0.373 | 0.961 |

Examples 18-27, Comparative Example 3

Examples 18 to 27 are different from Examples 9 to 17 in that the spread angles $L_x$ and $L_y$ of the laser light source 10 are changed. In Examples 18 to 27, the spread angle $L_x$ in the x direction of the light emitted from the laser light source 10 was set to 7.9°, and the spread angle in the y direction was set to 32.85°. Further, in Examples 18 to 27, the diffusion angle $\theta_d$ of the diffuser plate 20 is different. In Comparative Example 3, the diffuser plate 20 was not arranged, and the diffusion angle $\theta_d$ was set to 0°. Other conditions were the same as in Example 9, and the spread angles $\theta_x$ and $\theta_y$ of the light emitted from the diffuser plate 20 were obtained.

The results of Examples 18 to 27 and Comparative Example 3 are summarized in Tables 4 and 5.

TABLE 4

|  | $L_x$ (deg) | $\theta_d$ (deg) | $\theta_x$ (deg) | $\theta_d/L_x$ | $\theta_x/L_x$ |
|---|---|---|---|---|---|
| Comparative Example 3 | 7.9 | 0 | 7.90 | 0 | 1.000 |
| Example 18 | 7.9 | 1.97 | 7.87 | 0.249 | 0.996 |
| Example 19 | 7.9 | 3.91 | 7.93 | 0.495 | 1.004 |
| Example 20 | 7.9 | 4.88 | 8.26 | 0.618 | 1.046 |
| Example 21 | 7.9 | 5.85 | 8.19 | 0.741 | 1.037 |
| Example 22 | 7.9 | 7.78 | 8.78 | 0.985 | 1.111 |
| Example 23 | 7.9 | 9.74 | 8.93 | 1.233 | 1.130 |
| Example 24 | 7.9 | 12.17 | 9.34 | 1.541 | 1.182 |
| Example 25 | 7.9 | 14.13 | 9.95 | 1.789 | 1.259 |
| Example 26 | 7.9 | 16.12 | 10.33 | 2.041 | 1.308 |
| Example 27 | 7.9 | 21.10 | 12.19 | 2.671 | 1.543 |

TABLE 5

|  | $L_y$ (deg) | $\theta_d$ (deg) | $\theta_y$ (deg) | $\theta_d/L_y$ | $\theta_y/L_y$ |
|---|---|---|---|---|---|
| Comparative Example 3 | 32.85 | 0 | 32.85 | 0 | 1.000 |
| Example 18 | 32.85 | 1.97 | 32.43 | 0.060 | 0.987 |
| Example 19 | 32.85 | 3.91 | 32.37 | 0.119 | 0.985 |
| Example 20 | 32.85 | 4.88 | 32.20 | 0.149 | 0.980 |
| Example 21 | 32.85 | 5.85 | 32.17 | 0.178 | 0.979 |
| Example 22 | 32.85 | 7.78 | 32.56 | 0.237 | 0.991 |
| Example 23 | 32.85 | 9.74 | 31.64 | 0.296 | 0.963 |
| Example 24 | 32.85 | 12.17 | 32.80 | 0.370 | 0.998 |
| Example 25 | 32.85 | 14.13 | 33.23 | 0.430 | 1.012 |
| Example 26 | 32.85 | 16.12 | 31.94 | 0.491 | 0.972 |
| Example 27 | 32.85 | 21.10 | 32.88 | 0.642 | 1.001 |

Examples 28-36, Comparative Example 4

Examples 28 to 36 are different from Examples 9 to 17 in that the spread angles $L_x$ and $L_y$ of the laser light source 10 are changed. In Examples 28 to 36, the spread angle $L_x$ in the x direction of the light emitted from the laser light source 10 was s set to 11.65°, and the spread angle in the y direction was set to 32.17°. Further, in Examples 28 to 36, the diffusion angle $\theta_d$ of the diffuser plate 20 is different. In Comparative Example 4, the diffuser plate 20 was not arranged, and the diffusion angle $\theta_d$ was set to 0°. Other conditions were the same as in Example 9, and the spread angles $\theta_x$ and $\theta_y$ of the light emitted from the diffuser plate 20 were obtained.

The results of Examples 28 to 36 and Comparative Example 4 are summarized in Tables 6 and 7.

TABLE 6

|  | $L_x$ (deg) | $\theta_d$ (deg) | $\theta_x$ (deg) | $\theta_d/L_x$ | $\theta_x/L_x$ |
|---|---|---|---|---|---|
| Comparative Example 4 | 11.65 | 0 | 11.65 | 0 | 1.000 |
| Example 28 | 11.65 | 1.97 | 12.04 | 0.169 | 1.033 |
| Example 29 | 11.65 | 3.91 | 12.16 | 0.336 | 1.044 |
| Example 30 | 11.65 | 5.85 | 12.16 | 0.502 | 1.044 |

TABLE 6-continued

|  | $L_x$ (deg) | $\theta_d$ (deg) | $\theta_x$ (deg) | $\theta_d/L_x$ | $\theta_x/L_x$ |
|---|---|---|---|---|---|
| Example 31 | 11.65 | 7.78 | 11.8 | 0.668 | 1.013 |
| Example 32 | 11.65 | 9.74 | 12.20 | 0.836 | 1.047 |
| Example 33 | 11.65 | 12.17 | 12.67 | 1.045 | 1.088 |
| Example 34 | 11.65 | 14.13 | 13.26 | 1.213 | 1.138 |
| Example 35 | 11.65 | 16.12 | 13.51 | 1.384 | 1.160 |
| Example 36 | 11.65 | 21.10 | 14.08 | 1.811 | 1.209 |

TABLE 7

|  | $L_y$ (deg) | $\theta_d$ (deg) | $\theta_y$ (deg) | $\theta_d/L_y$ | $\theta_y/L_y$ |
|---|---|---|---|---|---|
| Comparative Example 4 | 32.17 | 0 | 32.17 | 0 | 1.000 |
| Example 28 | 32.17 | 1.97 | 32.24 | 0.061 | 1.002 |
| Example 29 | 32.17 | 3.91 | 32.92 | 0.122 | 1.023 |
| Example 30 | 32.17 | 5.85 | 32.26 | 0.182 | 1.003 |
| Example 31 | 32.17 | 7.78 | 32.43 | 0.242 | 1.008 |
| Example 32 | 32.17 | 9.74 | 33.02 | 0.303 | 1.026 |
| Example 33 | 32.17 | 12.17 | 31.09 | 0.378 | 0.966 |
| Example 34 | 32.17 | 14.13 | 31.94 | 0.439 | 0.993 |
| Example 35 | 32.17 | 16.12 | 32.19 | 0.501 | 1.001 |
| Example 36 | 32.17 | 21.10 | 31.35 | 0.656 | 0.975 |

Figure 15:
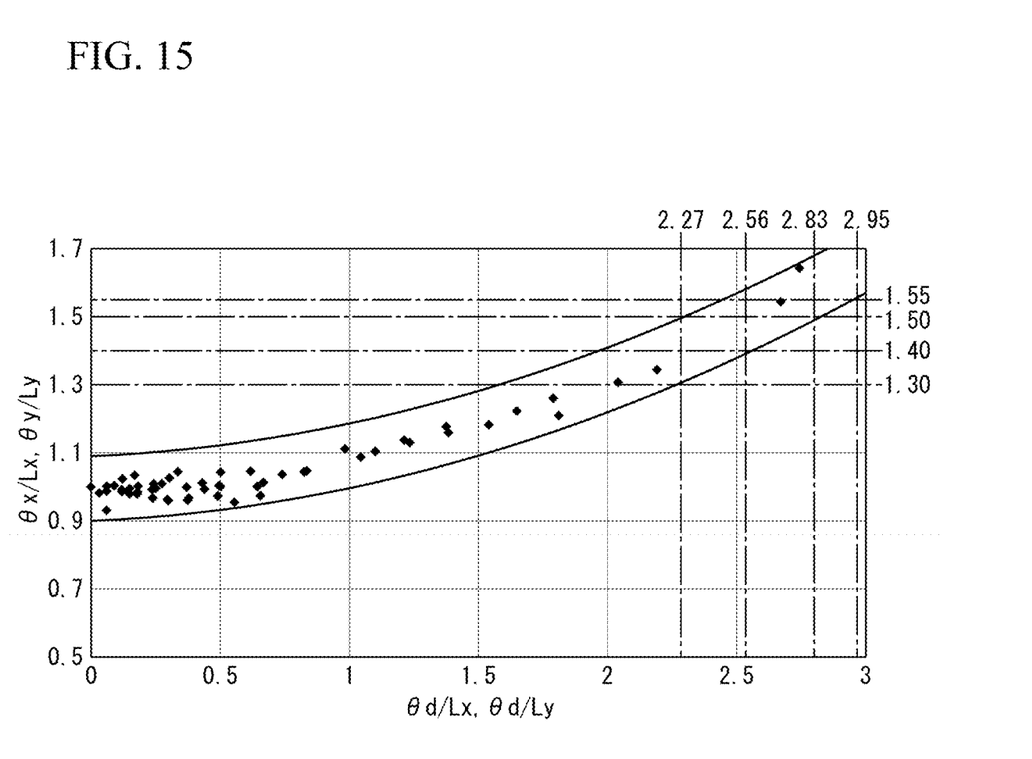
FIG. 15 is a graph summarizing the results of Examples 9 to 36 and Comparative Examples 2 to 4.

The results of Examples 9 to 36 are plotted in FIG. As a result, the results of all the examples were applied between the above relational expressions (1) and (2).

EXPLANATION OF REFERENCES

10, 11 laser light source
10A light source
10B support
10C curved surface
11A diode
20 diffuser plate
20a first plane
20b second surface
21 microlens
30 collimating lens
40 cover member (cap)
100, 101 laser device
200, 201, 202 projection type image display device
203, 204 sensing device
Op1, Op2, Op3, Op4, Op5 optical system
Rp reference surface
Sc screen
SE sensor

What is claimed is:

1. A laser device, comprising:
a laser light source;
a collimating lens that collimates the light output from the laser light source; and
a diffuser plate that diffuses the light from the laser light source before collimating,
wherein when the spread angle of the light output from the laser light source in the first direction is $L_x$, and the spread angle in the second direction orthogonal to the first direction is $L_y$, and the spread angle of the light passing through the diffuser plate in the first direction is $\theta_x$, and the spread angle of the second direction is $\theta_y$, the following inequalities, $\theta_x/L_x<1.55$ and $\theta_y/L_y<1.55$, are satisfied.

2. A projection type image display device, comprising;
the laser device according to claim 1; and
an optical system for projecting light output from the laser device.

3. A sensing device, comprising:
the laser device according to claim 1;
an optical system that irradiates an object with light from the laser device; and
a sensor that detects light from the object.

4. The laser devise according to claim 1, wherein the diffuser plate is a cover member that covers the output surface of the laser light source.

5. A laser device, comprising:
a laser light source;
a collimating lens that collimates the light output from the laser light source; and
a diffuser plate that diffuses the light from the laser light source before collimating,
wherein when the spread angle of the light output from the laser light source in the first direction is $L_x$, and the spread angle in the second direction orthogonal to the first direction is $L_y$, and the spread angle of the light passing through the diffuser plate in the first direction is $\theta_x$, and the spread angle of the second direction is $\theta_y$, and the diffusion angle of the diffuser plate is $\theta_d$, and $\theta_d/L_x$ is a, $\theta_x/L_x$ is b, $\theta_d/L_y$ is c, and $\theta_y/L_y$ is d, the following inequalities, $0.0641 \times a^2 + 0.0321 \times a + 0.92 + 0.0321 \times a + 1.09$, and $0.0641 \times c^2 + 0.0321 \times c + 0.92 + 0.0321 \times c + 1.09$, are satisfied.

6. The laser devise according to claim 5, wherein the diffuser plate is a cover member that covers the output surface of the laser light source.

7. A projection type image display device, comprising;
the laser devise according to claim 5; and
an optical system for projecting light output from the laser devise.

8. A sensing device, comprising:
the laser devise according to claim 5;
an optical system that irradiates an object with light from the laser device; and
a sensor that detects light from the object.

9. A laser device, comprising:
a laser light source;
a collimating lens that collimates the light output from the laser light source; and
a diffuser plate that diffuses the light from the laser light source before collimating,
wherein when the spread angle of the light output from the laser light source in the first direction is $L_x$, and the spread angle in the second direction orthogonal to the first direction is $L_y$, and the diffusion angle of the diffuser plate is $\theta_d$, the following inequalities, $0<\theta_x/L_x<2.95$ and $0<\theta_y/L_y<2.95$, are satisfied.

10. The laser devise according to claim 9, wherein the diffuser plate is a cover member that covers the output surface of the laser light source.

11. A projection type image display device, comprising;
the laser devise according to claim 9; and
an optical system for projecting light output from the laser devise.

12. A sensing device, comprising:
the laser devise according to claim 9;
an optical system that irradiates an object with light from the laser device; and
a sensor that detects light from the object.

* * * * *